(12) United States Patent
Piper

(10) Patent No.: US 7,090,306 B1
(45) Date of Patent: Aug. 15, 2006

(54) INLINE WHEEL WITH SOFTER TIRE AND INTERNAL SUPPORT STRUCTURE

(76) Inventor: Neal W. Piper, 15221 Transister La., Huntington Beach, CA (US) 92649

( * ) Notice: Subject to any disclaimer, the term of this patent is extended or adjusted under 35 U.S.C. 154(b) by 56 days.

(21) Appl. No.: 10/859,942

(22) Filed: Jun. 4, 2004

Related U.S. Application Data

(60) Provisional application No. 60/477,770, filed on Jun. 12, 2003.

(51) Int. Cl.
*B60C 7/12* (2006.01)
*B60C 7/22* (2006.01)
*B60C 7/24* (2006.01)

(52) U.S. Cl. .............................. 301/5.307; 301/5.301; 152/56

(58) Field of Classification Search ............ 301/5.301, 301/5.304, 5.306, 5.307, 5.308, 5.309; 152/8, 152/9, 323, 329, 53, 56, 59
See application file for complete search history.

(56) References Cited

U.S. PATENT DOCUMENTS

| | | | | |
|---|---|---|---|---|
| 5,265,659 A | * | 11/1993 | Pajtas et al. ................. | 152/329 |
| 5,692,809 A | * | 12/1997 | Hook ....................... | 301/5.307 |
| 5,908,519 A | | 6/1999 | Piper et al. ................. | 152/165 |
| 5,922,151 A | | 7/1999 | Piper et al. ................. | 152/310 |
| 5,942,068 A | * | 8/1999 | Adams et al. ............... | 156/112 |
| 6,036,278 A | | 3/2000 | Boyer ......................... | 301/5.3 |
| 6,102,091 A | * | 8/2000 | Peterson et al. ............ | 152/165 |
| 6,176,554 B1 | | 1/2001 | Huang ........................ | 301/5.3 |
| 6,227,622 B1 | | 5/2001 | Roderick et al. ............ | 301/5.3 |
| 6,655,747 B1 | * | 12/2003 | Young et al. ............ | 301/5.301 |

* cited by examiner

*Primary Examiner*—Russell D. Stormer
(74) *Attorney, Agent, or Firm*—Kenneth L. Green; Edgar W. Averill, Jr.

(57) ABSTRACT

A skate wheel including a tire support structure adapted to reduce roll resistance generally encountered from a tire comprising a 60 A to 75 A Shore hardness material. The tire support structure comprises a flexible torus portion proximal to an inner core, and a substantially rigid radially extending portion extending radially outward from the flexible torus portion. The flexible torus portion cooperates with the inner core to form a cavity. The radially extending portion extends to approximately eighty to ninety five percent of the total wheel diameter. When a load is placed on the wheel, the radially extending portion is pressed against the flexible torus portion, and the flexible torus portion deforms into the cavity. The combination of the radially extending portion and the flexible torus portion moderates distortion of the soft tire, thereby reducing roll resistance. The resulting combination of a relatively hard radially extending portion and a relatively soft tire, allows for a more optimal balance of low rolling resistance and high traction.

20 Claims, 4 Drawing Sheets

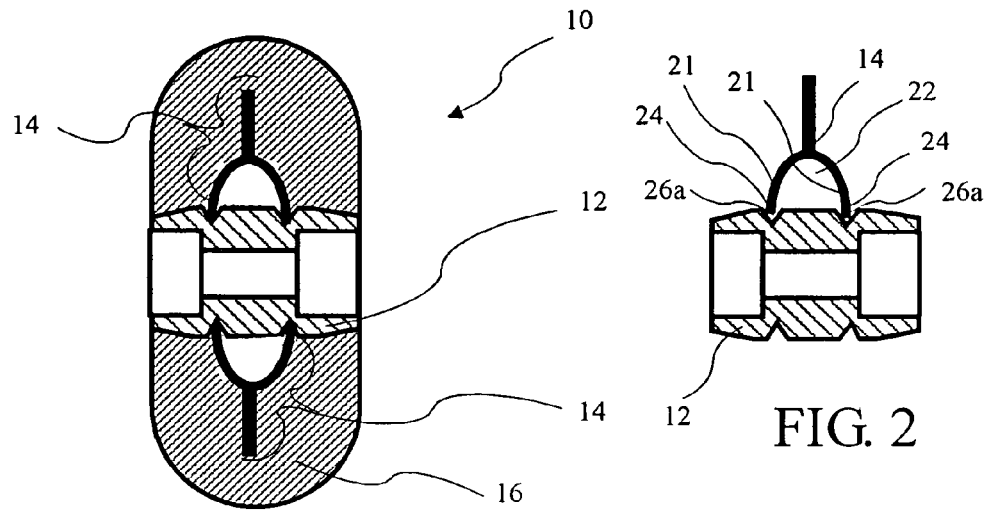
FIG. 1
FIG. 2
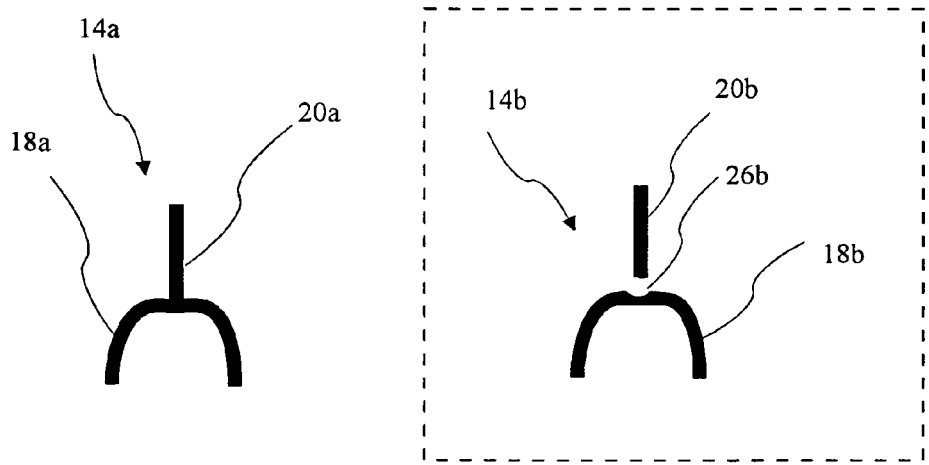
FIG. 3A
FIG. 3B

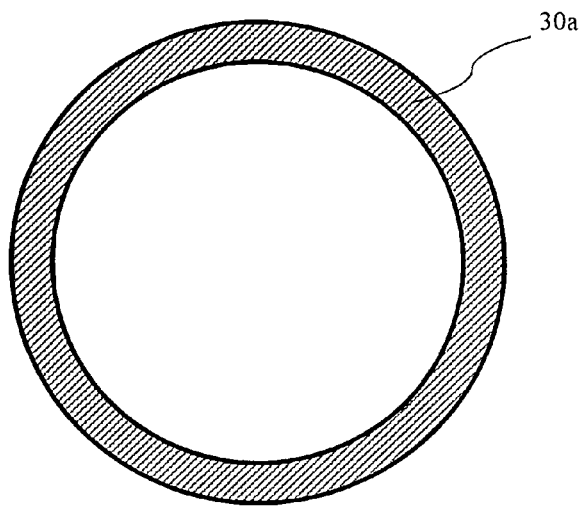
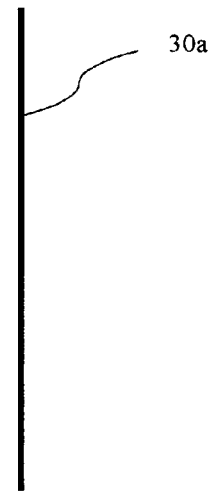
FIG. 5A  FIG. 5B
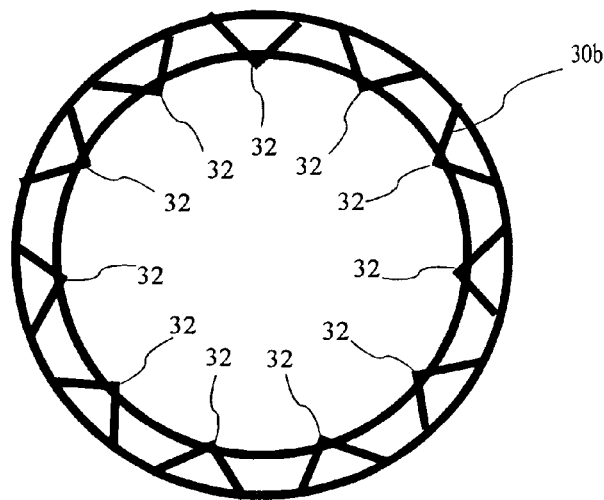
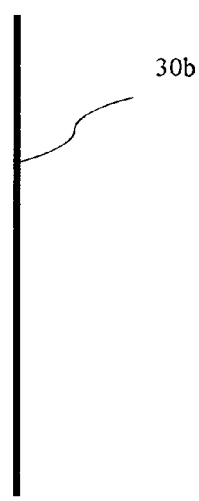
FIG. 6A  FIG. 6B

INLINE WHEEL WITH SOFTER TIRE AND INTERNAL SUPPORT STRUCTURE

The present application claims the benefit of U.S. Provisional Application Ser. No. 60/477,770, mailed Jun. 12, 2003, which application is incorporated herein by reference.

BACKGROUND OF THE INVENTION

The present invention relates to inline skate wheels, and more particularly to inline skate wheels having an internal tire support structure allowing a softer tire material without increased roll resistance.

Inline skates have been in wide use since the early 1990's. Inline skates generally comprise a boot, shoe, or the like, having a multiplicity of wheels attached to the bottom, which wheels are in-line. Early skate wheels comprised a relatively hard injection molded polyurethane plastic inner core and a relatively soft open cast thermoset polyurethane tire surrounding the inner core. Individual wheels may vary in outside diameter and in relative softness of the tire. A softer tire results in greater grip, and a harder tire reduces rolling resistance.

The inner core in skate wheels designed in the early 90's generally comprised a hard plastic material and a diameter about sixty to seventy percent of the tire outside diameter. A smaller diameter inner core may result in a wheel without sufficient support under horizontal traction loading (i.e., side loads). A larger diameter inner core may result in a "hard" feel and vibrations. Typically, the tire may be a 76 A hardness (76 Shore Hardness A), material. A harder tire material may be used to obtain greater support, but with a loss of traction, and a softer material may be used to obtain greater traction, but with a loss of support. Such typical tire may be made from Polytetramethylene Ether Glycol (PT-MEG) ether-based, high rebound, thermoset, polyurethane elastomer formulation using a gravity fill, liquid to solid, cured casting manufacturing method.

U.S. Pat. No. 5,908,519 issued Jun. 1, 1999 for "Hollow Core In-line Skate Wheel Having Contour Conforming Polyurethane Wall," teaches skate wheels having a tubular bladder. The bladder allows the tire to conform to a surface for greater traction. Unfortunately, when used by roller hockey players weighing one hundred and seventy five pounds or more, deformation of the tire (e.g., conformance of the tire to the riding surface) allowed by the bladder resulted in increased roll resistance. U.S. Pat. No. 5,922,151 issued on Jul. 13, 1999 for "Polyurethane Skate Wheel with Shaped Foam Core," utilizes a foam insert suspended in the tire to replace the bladder of the '519 patent, to reduce the conformance of the tire under straight rolling. The wheel of the '151 patent had slightly less roll resistance than the wheel of the '519 patent, but the energy absorption of the foam was inefficient, and heat build-up resulted.

In 1999, Kyrptonics in Cypress, Calif. introduced a skate wheel having an 82 A hardness solid insert bonded directly to the inner core. The insert is made of high rebound thermoset polyurethane with much lower compressive losses than the foam of the '151 patent, but the overall stiffness limits traction to be less than desirable. The Kyrptomics wheels reduce roll resistance, but do not provide sufficient structural support to allow a softer polyurethane material to be used for the tire. Redstar Wheels in Garden Grove, Calif. designed a skate wheel similar to the Kyrptonics wheels, but with a near 88 A hardness insert. The resulting wheel had low roll resistance, but at the cost of much reduced traction as well.

Another attempt at a low roll resistance skate wheel with good traction was made by Labeda Precision Sports, Inc. in Lake Elsinore, Calif. The Labeda wheels included an 85 A hardness transition layer bonded to the inner core, and a 78 A hardness rebound ring bonded to the transition layer. Although some improvements to performance were made, the Labeda wheel still required about a 76 A tire to avoid increased roll resistance.

The "Rink Rat" wheel manufactured by MPC in Cranston, R.I., have a soft inner layer covered by a harder outer layer, and is described in U.S. Pat. No. 6,036,278 issued Mar. 14, 2000 for "Multi Durometer Wheel for In-Line Skates," and U.S. Pat. No. 6,227,622 issued May 8, 2001 for "Multilayer Skate Wheel." Unfortunately, the soft inner core allows the Rink Rat wheels to deform (i.e., flatten) during straight line skating, resulting in roll resistance, and requires a tire of 76 A or greater hardness.

Roller hockey presently competes for audience with ice hockey. In order to be successful, roller hockey must provide the same "quickness" that ice hockey audiences are accustomed to. Obtaining such quickness requires skate wheels which overcome the deficiencies of known skate wheels, and unfortunately, the various wheels described above have failed to provide a wheel combining low rolling resistance for speed, and traction for maneuvering, and in general require a hard tire (i.e., at least 76 A hardness.) Thus, there remains a need for a skate wheel with reduced roll resistance and sufficient traction, and which does not result in heat buildup.

BRIEF SUMMARY OF THE INVENTION

The present invention addresses the above and other needs by providing a skate wheel including a tire support structure adapted to reduce roll resistance generally encountered from a tire comprising a 60 A to 75 A Shore hardness material. The tire support structure comprises a flexible torus portion proximal to an inner core, and a substantially rigid radially extending portion (or ring) extending radially outward from the flexible torus portion. The flexible torus portion cooperates with the inner core to form a cavity. The radially extending portion extends to approximately eighty to ninety five percent of the wheel diameter. When a load is placed on the wheel, the radially extending portion is pressed against the flexible torus portion, which flexible torus portion partially hinges or deforms into the cavity. The combination of the radially extending portion and the flexible torus portion moderates distortion of the tire, thereby reducing roll resistance, and the use of the flexible torus portion hinging into the cavity reduces the creation of heat. The resulting combination of a relatively hard ring and a relatively soft tire, allows for a faster wheel that also retains traction.

In accordance with one aspect of the invention, there is provided a skate wheel comprising an inner core, a tire support structure, and a tire molded over the tire support structure. The tire preferably comprises between an approximately 60 A and 75 A Shore hardness material, thereby providing good traction. The tire support structure comprises a substantially rigid radially extending portion and a flexible torus portion residing proximal to the inner core, wherein the radially extending portion extends radially out from the flexible torus portion, thereby providing support for the tire, and thereby reducing roll resistance.

It is a feature of the present invention to provide a low roll resistance skate wheel comprising an inner core, a tire support structure comprising a substantially rigid radially extending portion and a flexible torus portion residing proximal to the inner core, wherein the radially extending portion extends radially out from the flexible torus portion, and a tire molded over the tire support structure. The tire comprises between an approximately 60 A and 75 A Shore hardness material. The radially extending portion extends radially to between approximately eighty percent to approximately ninety five percent of the diameter of the tire, and the radially extending portion comprises between an approximately 95 A and approximately 55 D Shore hardness material. The flexible torus portion comprises between an approximately 80 A and approximately 90 A Shore hardness material, and cooperation of the flexible torus portion and the inner core defines a cavity.

It is a further feature of the invention to provide a low roll resistance skate wheel comprising an inner core, a one piece tire support structure comprising a substantially rigid radially extending portion and a flexible torus portion residing proximal to the inner core, wherein the radially extending portion extends radially out from the flexible torus portion, and a tire molded over the tire support structure. The radially extending portion further comprises a ring. The cross-section of the flexible torus portion defines a pair of inwardly extending rings, and after assembly, the inwardly extending rings face the inner core and the cooperation between the inwardly extending rings and the inner core defines a cavity residing between the flexible torus portion and the inner core. The flexible torus portion further defines hinge portions adapted to allow the flexible torus portion to deflect into the cavity when force is exerted on the tire. The one piece tire support structure is made from between an approximately 85 A and approximately 90 A Shore hardness material.

The skate wheel of the present invention may be useful as a roller hockey wheel, an inline roller racing wheel, an inline fitness wheel, an inline recreational skate wheel, an inline off-road skate wheel, an inline aggressive skate wheel, a quad roller skate wheel, a skateboard wheel, a roller shoe (e.g., Heely) wheel, a non-pneumatic bicycle tire, a non-pneumatic car spare tire, a, non-pneumatic motorcycle tire, (e.g., an ice racing tire), or a non-pneumatic scooter tire.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 shows a cross-sectional view of a wheel according to the present invention.

FIG. 2 depicts the cooperation of a tire support structure and an inner core of the skate wheel.

FIG. 3A shows a one piece embodiment of the tire support structure.

FIG. 3B shows a two piece embodiment of the tire support structure comprising a flexible torus portion and a radially extending portion.

FIG. 5A shows a side view of an embodiment of a radially extending portion comprising a thin solid ring.

FIG. 5B shows an edge view of the embodiment of the radially extending portion comprising a thin solid ring.

FIG. 6A shows a side view of an embodiment of a radially extending portion comprising a thin trestle-like ring.

FIG. 6B shows an edge view of the embodiment of the ring comprising a thin thin trestle-like ring.

Corresponding reference characters indicate corresponding components throughout the several views of the drawings.

DETAILED DESCRIPTION OF THE INVENTION

Figure 4A:
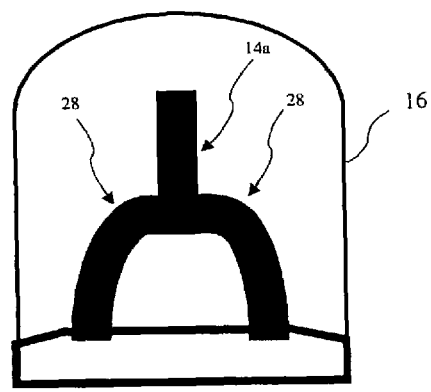
FIG. 4A identifies hinge portions of the tire support structure.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

The present invention comprises a skate wheel including a tire support structure adapted to reduce roll resistance generally encountered from a soft tire. The tire support structure comprises a flexible torus portion proximal to an inner core of the wheel, and a substantially rigid radially extending portion (e.g., a ring) extending radially outward from the flexible torus portion. The flexible torus portion cooperates with the inner core to form a leaky cavity. The radially extending portion extends to approximately eighty to approximately ninety five percent of the wheel diameter. When a load is placed on the wheel, the substantially rigid radially extending portion is pressed against the flexible torus portion, causing the flexible torus portion to partially collapses into the cavity. The combination of the substantially rigid radially extending portion and the flexible torus portion moderates distortion of the wheel, thereby reducing roll resistance. The resulting combination of a relatively hard radially extending portion and a relatively soft tire, allows for a faster wheel that also retains traction.

A cross-sectional view of a wheel 10 according to the present invention is shown in FIG. 1. The wheel 10 comprises an inner core 12, a tire support structure 14, and a tire 16. The inner core 12 is essentially rigid and may be made from a 70 D Shore harness material. The inner core 12 may be solid or hollow, and may be one or two piece, is generally approximately sixty percent to approximately seventy percent of tire outside diameter, and preferably bonds freely with tire 16 material. The inner core 12 generally includes surface which cooperate with 608 style bearing. The tire 16 preferably has an outside diameter between approximately sixty millimeters and approximately one hundred millimeters and more preferably defines an approximately eighty millimeter outside diameter. The tire 16 preferably is made from an approximately 60 A to approximately 75 A Shore hardness material, and more preferably from an approximately 60 A Shore harness material. A preferred tire 16 material is Polytetramethylene Ether Glycol (PTMEG) ether-based, high rebound, thermoset, polyurethane elastomer formulation. In some applications, the tire 16 may be made from ethylene/butylene adipate based, ester type, thermoset, high abrasive, liquid cast polyurethane of between approximately 65 A to approximately 85 A Shore hardness. Preferably, a tire material is used which bonds freely with core 12 and tire support structure 14 materials.

A more detailed view of the inner core 12 and tire support structure 14 is shown in FIG. 2. The inner core 12 includes first grooves 26a circling the outside radius of the inner core 12. The tire support structure 14 comprises a flexible torus portion having a "U" shaped cross-section and including a pair of inwardly extending rings (or legs) 21 extending towards the inner core 12, and a radially extending portion extending out from the torus portion. The pair of inwardly extending rings 21 define edges 24 adapted to cooperate with the grooves 26a to position the tire support structure 14 on the inner core 12. The cooperation of the tire support structure 14 and the inner core 12 defines a cavity 22 between the tire support structure 14 and the inner core 12. The cavity 22 may further be a leaky cavity, i.e., not sealed or not air tight.

In a preferred embodiment, the tire support structure 14 comprises a single piece tire support structure 14a having fused first substantially rigid radially extending portion 20a and first flexible torus portion 18a as shown in FIG. 3A. In another preferred embodiment, the tire support structure 14 comprises a two piece tire support structure 14b having cooperating second substantially rigid radially extending portion 20b and second flexible torus portion 18b as shown in FIG. 3B. The flexible torus portion 18b includes an outwardly facing groove 26b circling the outside radius on the flexible torus portion 18b, wherein the radial extending portion 20b cooperates with the groove 26b to position the radial extending portion 20b on the flexible torus portion 18b.

The flexible torus portion 18b is preferably an 80 A to a 90 A Shore hardness material, and more preferably 85 A Shore hardness material. The radially extending portion 20b is preferably a 90 A to 55 D Shore hardness material, and more preferable an approximately 95 A Shore hardness material. The radially extending portion 20b is preferably made from Pebax® resin and is preferably injection molded, and preferably has an outer radius size of approximately eighty percent to approximately ninety five percent of the tire 16 outside diameter, and more preferably has an outer radius size of approximately eighty percent to approximately eighty five percent of the tire 16 outside diameter, and most preferably has an outer radius size of approximately eighty percent of the tire 16 diameter. The radially extending portion 20b preferable defines a thin ring, and is preferably solid or defines a trestle structure, and is preferably made from a material which bonds freely with tire 16 material.

Figure 4B:
FIG. 4B depicts the deformation of the tire support structure into a cavity when radial force is exerted on the tire.
Figure 4B:
Figure 4B:
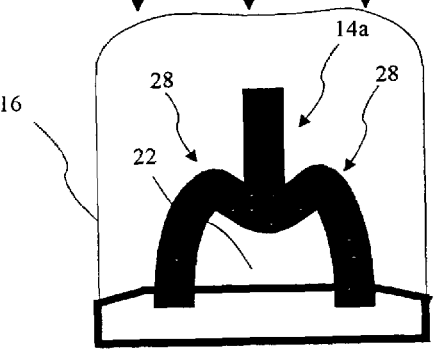
Figure 4C:
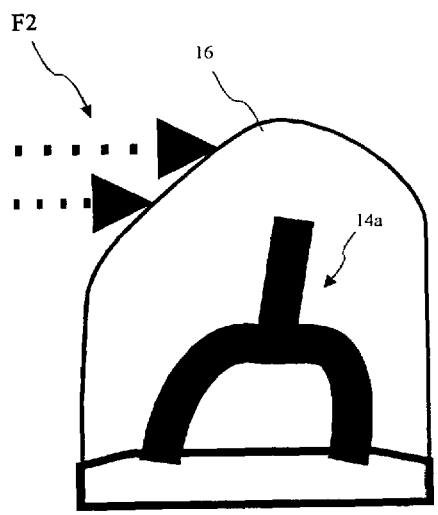
FIG. 4C depicts the lateral distortion of the tire support structure when lateral force is exerted on the tire.

The one piece tire support structure 14a is shown in a relaxed position within the tire 16 in FIG. 4A. The tire support structure 14a defines various thicknesses, for example, reduced thickness at hinge portions 28, which hinge portions 28 are preferably approximately one eighth inch wide and approximately one sixteenth inch thick. The one piece tire support structure 14a preferably defines thicknesses adapted to promote the desired action when force is applied to the tire 16. For example, the thin hinge portions 28 allow the tire support structure 14a to flex in a desired manner when radial force F1 is applied, as shown in FIG. 4B. The tire support structure 14a further provides support when the tire is subjected to a lateral force F2 as shown in FIG. 4C. By controlling thickness, a single material may be used for the entire tire support structure 14a. The one piece tire support structure 14a may be made from a material approximately 5 A softer then the radially extending portion 20b, or alternatively approximately 10 A to approximately 30 A harder than tire 16. The one piece tire support structure 14a is preferable made from an approximately 85 A to approximately 90 A Pebax® resin. The one piece tire support structure 14a may alternatively be molded from lower cost injection materials such as TPU, Hytrel, PVC, Syrlyn, or impact modified ABS, and is preferably treated with a bonding agent.

In embodiments of the wheel 10 including the one piece tire support structure 14a, the tire 16 is preferably an approximately 60 A to approximately 75 A cast PTMEG high rebound Ether Polyurethane. The tire 16 is preferably made of polyurethane thermoset available from the Uniroyal Chemical Crompton Corportion Middlebury, Conn. Alternatively, as a low cost option, the tire 16 may be made from poly-propylene glycol based ether type, thermoset, high abrasive, liquid cast polyurethane with approximately 75 A to approximately 95 A Shore hardness.

In an alternative embodiment of the wheel 10, a softer flexible torus portion and a stiffer radially extending portion of eighty percent to ninety percent of tire radius may be utilized. A harder tire material may also be used, for example, a 65 A to 85 A Shore hardness tire. The alternative flexible torus portion 18b may be made from an 85 A material, but with cross-section providing easier flex. Alternatively, the alternative flexible torus portion 18b may be made from an 80 A to 90 A Pebax® resin, and may include up to thirty two gussets or ribs to improve load bearing and deflection capabilities. The radially extending member may, for example, be a metal ring, and of up to 70 D Shore hardness.

A first example of a stiffer radially extending portion comprises a solid ring 30a shown in side view in FIG. 5A, and in edge view in FIG. 5B. The ring 30a may preferably comprise an approximately 55 D to 70 D Shore hardness material, and more preferably comprise an approximately 70 D Shore hardness material. The ring 30 preferably defines an outside diameter of approximately eighty percent to approximately ninety percent of the wheel diameter, and may be made of plastic or metal, and may for example be made of stainless steel, titanium, or aluminum. The ring 30a may further be treated with bonding agent. Alternatively, the stiffer radially extending portion may comprise a trestle-like ring 30b shown in FIG. 6A in side view, and in FIG. 6B in edge view. The ring 30b inside diameter may further include points 32 to facilitate the insertion and retention of the ring 30b into the groove 26b.

In high load uses, a harder tire may be made from a material having greater than approximately 75 A Shore hardness, and as much as approximately 95 A Shore hardness. The harder tire may further be made from high abrasion resistance ester-type resins having approximately 65 A to approximately 85 A Shore hardness, made from PTMEG thermoset, high rebound, liquid cast polyurethane having approximately 75 A to approximately 55 D Shore hardness, or made from ethylene/butylene adipate based ester type, thermoset, high abrasive liquid cast polyurethane having approximately 80 A to approximately 60 D Shore hardness.

In another embodiment, the flexible torus portion may include alignment ribs or gussets which line the inside of the cavity 22 (FIG. 2). The ribs may comprise 8 to 32 ribs running in horizontal or axial direction, and axially aligned. The ribs may extend inwardly approximately twenty five percent of the overall radius of the flexible torus portion.

Figure 7:
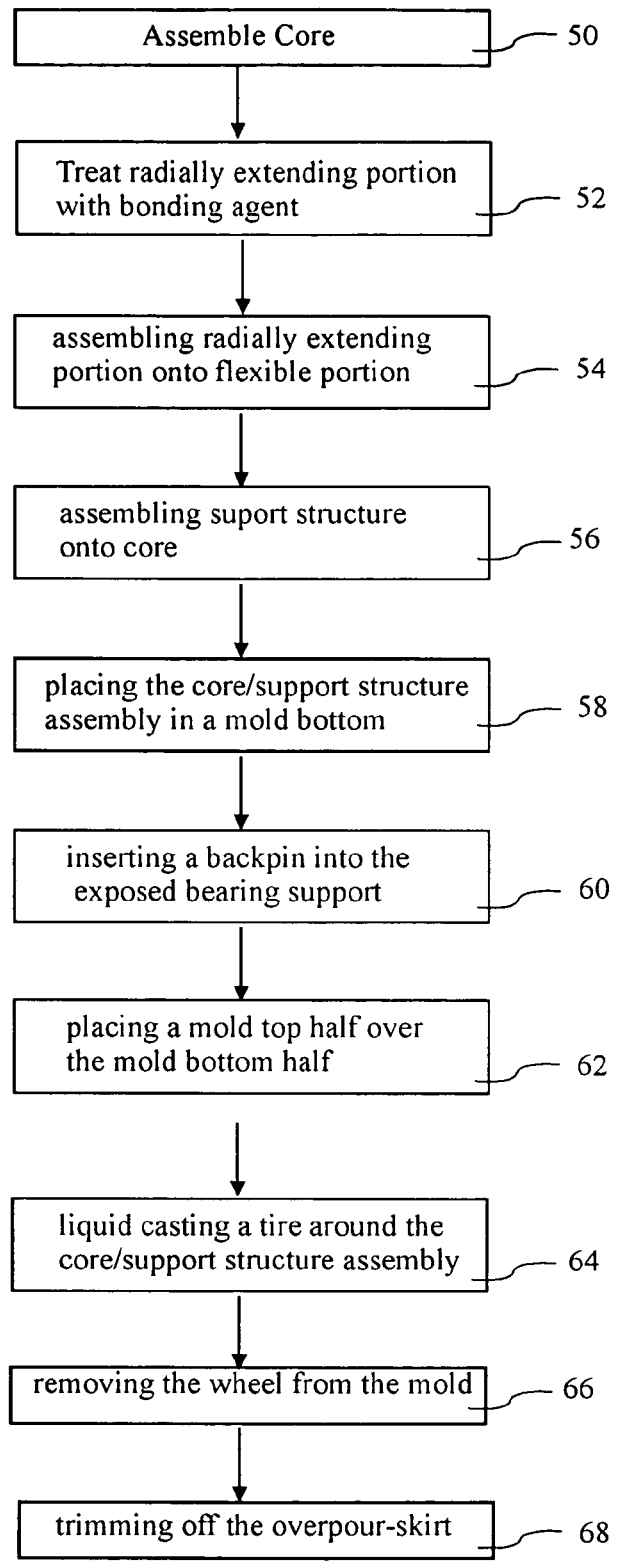
FIG. 7 depicts a method for manufacturing a wheel according to the present invention.

A method for manufacturing the wheel is described in FIG. 7. The method may include the steps of assembling core halves at 50, treating a radially extending portion with bonding agent if required at 52, assembling the radially extending portion onto the flexible torus portion if the support member is a two piece support member at 54, assembling the tire support structure onto core at 56, placing the core/tire support structure assembly in a mold bottom half using a center support to hold the core/flexible torus portion assembly in place at 58, inserting a back-pin into the exposed bearing support at 60, placing a mold top half over the mold bottom half at 62, liquid casting a tire around the core/torus-ring assembly at 64, removing the wheel from the mold at 66, and trimming off the overpour-skirt at 68.

The method may further include one or more of the steps of casting the tire using a low pressure gravity filling system, assembling radially extending portion onto flexible torus portion by inserting the inwardly facing rings of the flexible torus portion so that they cooperate with grooves in the core, and waiting five minutes after casting the tire before removing the wheel from the mold.

While the present invention is described above through examples, any wheel including a relatively soft tire, and a harder tire support structure comprising a flexible member (which flex may be achieve by thickness or by material hardness) and a relatively stiff radially extending member (which stiffness may be achieve by thickness or by material hardness) in cooperation with the flexible member, wherein distortion of the tire is transmitted by the radially extending member to the flexible member, and wherein the flexible member flexes (e.g., hinges) to regulate tire distortion, is intended to come within the scope of the present invention. For example, the present invention may be embodied in a roller-coaster wheel comprising a profile suitable for a roller-coaster, and materials having hardness suitable for a roller coaster, for example, a 55 D tire material.

While the invention herein disclosed has been described by means of specific embodiments and applications thereof, numerous modifications and variations could be made thereto by those skilled in the art without departing from the scope of the invention set forth in the claims.

I claim:

1. A wheel comprising:
    a drum shaped inner core having surfaces which cooperate with wheel bearings;
    a tire support structure comprising:
        a torus portion having a "U" shaped cross-section, wherein legs of the "U" extend inward towards the inner core and terminate proximal to the inner core, wherein the torus portion defines a cavity; and
        a substantially rigid radially extending portion extending radially out from the torus portion; and
    a tire molded over a top and sides of the tire support structure and extending inward to the inner core.

2. The wheel of claim 1 wherein the tire comprises between an approximately 60 A and approximately 75 A Shore hardness material.

3. The wheel of claim 1 wherein the radially extending portion comprises a ring, and wherein a cross-section of the torus portion defines a pair of inwardly extending rings, wherein the pair of inwardly extending rings face the inner core.

4. The wheel of claim 1 wherein the radially extending portion extends radially to between approximately eighty percent to approximately ninety five percent of the outside diameter of the tire.

5. The wheel of claim 1 wherein the radially extending portion extends radially to between approximately eighty percent to approximately ninety five percent of the outside diameter of the tire.

6. The wheel of claim 1 wherein the radially extending portion comprises between an approximately 95 A and 55 D Shore hardness material.

7. The wheel of claim 1 wherein the radially extending portion comprises an approximately 95 A Shore hardness material.

8. The wheel of claim 1 wherein the radially extending portion comprises a thin solid ring.

9. The wheel of claim 1 wherein the radially extending portion comprises a ring defining a thin trestle-like structure.

10. The wheel of claim 1 wherein an outer surface of the inner core defines at least two grooves, and wherein the legs of the "U" extend inward to cooperate with the grooves to position the torus portion on the inner core.

11. The wheel of claim 10 wherein the cooperation of the torus portion and the inner core defines the cavity.

12. The wheel of claim 1 wherein the torus portion comprises between an approximately 80 A and approximately 90 A Shore hardness material.

13. The wheel of claim 1 wherein the torus portion comprises an approximately 85 A Shore hardness material.

14. The wheel of claim 1 wherein the tire is approximately eighty millimeters in outside diameter.

15. The wheel of claim 1 wherein said tire support structure comprises a one piece tire support structure.

16. The wheel of claim 1 wherein the one piece tire support structure comprises between an approximately 85 A and approximately 90 A Shore hardness material.

17. The wheel of claim 1 wherein the one piece tire support structure defines a thickness adapted to provide the substantially rigid radially extending portion, and a collapsible torus portion.

18. The wheel of claim 1 wherein:
    the tire comprises between an approximately 95 A and approximately 55 D Shore hardness material;
    the radially extending portion comprises a ring extending radially to between approximately eighty percent to approximately ninety five percent of the diameter of the tire, and comprises between an approximately 55 D and approximately 70 D Shore hardness material; and
    a cross-section of the torus portion defines a pair of inwardly extending legs, wherein the pair of inwardly extending legs face the inner core, and the cooperation of the pair of inwardly extending legs and inner core defines a cavity.

19. A low rolling resistance high traction skate wheel comprising:
    a drum shaped inner core having surfaces which cooperate with wheel bearings;
    a one piece tire support structure comprising:
        a flexible torus portion having a "U" shaped cross-section, wherein legs of the "U" extend inward towards the inner core and terminate proximal to the inner core; and
        a substantially rigid radially extending portion extending radially out from the torus portion; and
    a tire molded over the a top and sides of tire support structure and extending inward to intimate contact with the inner core,
    wherein:
        the tire comprises between an approximately 60 A and 75 A Shore hardness material;
        the radially extending portion extends radially to between approximately eighty percent to approximately ninety five percent of the diameter of the tire;
        the flexible torus portion defines a cavity residing between the flexible torus portion and the inner core, wherein the flexible torus portion deforms into the cavity when force is exerted on the tire; and the tire support structure comprises between an approximately 85 A and approximately 90 A Shore hardness material.

20. A low rolling resistance high traction skate wheel comprising:
   a drum shaped inner core having surfaces which cooperate with wheel bearings;
   a tire support structure comprising:
      a flexible torus portion having a "U" shaped cross-section, wherein legs of the "U" extend inward towards the inner core and terminate proximal to the inner core; and
      a substantially rigid radially extending portion extending radially out from the torus portion; and
   a tire molded over the a top and sides of tire support structure, and extending inward to intimate contact with the inner core, wherein:
      the tire comprises between an approximately 60 A and 75 A Shore hardness material;
      the radially extending portion extends radially to between approximately eighty percent to approximately ninety five percent of the outside diameter of the tire, and wherein the radially extending portion comprises between an approximately 95 A and approximately 55 D Shore hardness material; and
      the flexible torus portion comprises between an approximately 80 A and approximately 90 A Shore hardness material, and wherein cooperation of the flexible torus portion and the inner core defines a cavity.

* * * * *